US 9,789,905 B2

(12) United States Patent
Matsuno et al.

(10) Patent No.: US 9,789,905 B2
(45) Date of Patent: Oct. 17, 2017

(54) VEHICLE TRAVELING CONTROL APPARATUS

(71) Applicant: SUBARU CORPORATION, Tokyo (JP)

(72) Inventors: Koji Matsuno, Tokyo (JP); Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/247,487

(22) Filed: Aug. 25, 2016

(65) Prior Publication Data

US 2017/0057544 A1    Mar. 2, 2017

(30) Foreign Application Priority Data

Sep. 2, 2015    (JP) .................................. 2015-173168

(51) Int. Cl.
*B62D 15/02*    (2006.01)
*B62D 5/04*    (2006.01)
(Continued)

(52) U.S. Cl.
CPC ......... *B62D 15/0255* (2013.01); *B60W 10/20* (2013.01); *B62D 5/046* (2013.01);
(Continued)

(58) Field of Classification Search
CPC .... B62D 15/0255; B62D 5/046; B62D 6/005; B62D 15/021; B62D 15/025; B60W 10/20; G05D 1/0278
See application file for complete search history.

(56) References Cited

U.S. PATENT DOCUMENTS 4,755,729 A * 7/1988 Gotou ................. H02P 23/0077
388/809
6,122,579 A * 9/2000 Collier-Hallman .. B62D 5/0472
180/234
(Continued)

FOREIGN PATENT DOCUMENTS

DE    102005049042 A1    4/2006
DE    102010033530 A1    12/2011
(Continued)

OTHER PUBLICATIONS

Decision to Grant issued in corresponding Japanese Patent Application No. 2015-173168, dated Nov. 8, 2016.
(Continued)

*Primary Examiner* — Calvin Cheung
(74) *Attorney, Agent, or Firm* — McDermott Will & Emery LLP

(57) ABSTRACT

A vehicle traveling control apparatus includes a vehicle parameter detector, a vehicle parameter estimator, a disturbance-suppressing parameter calculator, an addition rate changer, and a disturbance suppressor. The vehicle parameter detector detects a vehicle parameter. The vehicle parameter estimator estimates, by means of a vehicle model, a vehicle parameter to be outputted in response to an input value. The disturbance-suppressing parameter calculator estimates, based on the vehicle parameters detected by the vehicle parameter detector and estimated by the vehicle parameter estimator, a disturbance generated at a vehicle, and calculates a disturbance-suppressing parameter. The addition rate changer identifies, based on the vehicle parameters detected by the vehicle parameter detector and estimated by the vehicle parameter estimator, the disturbance generated at the vehicle, and variably sets, based on the identified disturbance, an addition rate of the disturbance-
(Continued)

suppressing parameter. The disturbance suppressor adds the disturbance-suppressing parameter set by the addition rate changer.

13 Claims, 9 Drawing Sheets

(51) Int. Cl.
  *B62D 6/00* (2006.01)
  *G05D 1/02* (2006.01)
  *B60W 10/20* (2006.01)
(52) U.S. Cl.
  CPC ........... *B62D 6/005* (2013.01); *B62D 15/021* (2013.01); *B62D 15/025* (2013.01); *G05D 1/0278* (2013.01)

(56) References Cited

U.S. PATENT DOCUMENTS

| | | | | |
|---|---|---|---|---|
| 6,381,525 | B1* | 4/2002 | Hori | B62D 5/0457 |
| | | | | 180/446 |
| 6,658,335 | B2* | 12/2003 | Kleinau | B62D 5/0463 |
| | | | | 180/443 |
| 7,273,127 | B2* | 9/2007 | Pick | B62D 7/22 |
| | | | | 180/446 |
| 9,061,701 | B2* | 6/2015 | Hales | B62D 5/0472 |
| 2004/0099469 | A1* | 5/2004 | Koibuchi | B60T 8/175 |
| | | | | 180/421 |
| 2006/0080016 | A1 | 4/2006 | Kasahara et al. | |
| 2008/0243329 | A1* | 10/2008 | Hamel | B62D 5/0472 |
| | | | | 701/31.4 |
| 2009/0078494 | A1* | 3/2009 | Dornhege | B62D 5/0472 |
| | | | | 180/446 |
| 2009/0254252 | A1* | 10/2009 | Kifuku | B62D 5/0463 |
| | | | | 701/42 |
| 2013/0030648 | A1* | 1/2013 | Matsumoto | B60W 10/04 |
| | | | | 701/37 |
| 2013/0233639 | A1* | 9/2013 | Kodato | B62D 5/0463 |
| | | | | 180/446 |
| 2014/0222295 | A1* | 8/2014 | Dornhege | B62D 6/002 |
| | | | | 701/42 |
| 2015/0088381 | A1* | 3/2015 | Imamura | B62D 5/0472 |
| | | | | 701/41 |
| 2016/0200354 | A1* | 7/2016 | Kimura | B62D 5/0472 |
| | | | | 701/42 |
| 2016/0318546 | A1* | 11/2016 | Lee | B62D 5/0466 |

FOREIGN PATENT DOCUMENTS

| | | |
|---|---|---|
| DE | 102014200638 A1 | 7/2015 |
| JP | 2001-97234 A | 4/2001 |
| JP | 2005-280368 A | 10/2005 |
| JP | 2006-111099 A | 4/2006 |
| JP | 2007-237840 A | 9/2007 |
| JP | 2012-020652 A | 2/2012 |

OTHER PUBLICATIONS

Office Action issued in related German Patent Application No. 10 2016 115 339.7, dated Apr. 21, 2017.

* cited by examiner

| R₁ | a1 | a2 |
|---|---|---|
| 30 | 0.6 | 0.4 |
| 20 | 1 | 0 |
| 10 | 0 | 1 |
| 0 | 0 | 0 |

FIG. 6

| R₂ | a3 | a4 | K₂ |
|---|---|---|---|
| 30 | 0.7 | 0.3 | 5 |
| 20 | 1 | 0 | 4 |
| 10 | 0 | 1 | 3 |
| 0 | 0 | 0 | 0 |

FIG. 7

| R₃ | a5 | a6 | K₃ |
|---|---|---|---|
| 30 | 0.9 | 0.1 | 4 |
| 20 | 1 | 0 | 3 |
| 10 | 0 | 1 | 1 |
| 0 | 0 | 0 | 0 |

FIG. 8

VEHICLE TRAVELING CONTROL APPARATUS

CROSS-REFERENCE TO RELATED APPLICATIONS

The present application claims priority from Japanese Patent Application No. 2015-173168 filed on Sep. 2, 2015, the entire contents of which are hereby incorporated by reference.

BACKGROUND

The technology relates to a vehicle traveling control apparatus of a vehicle that utilizes an automatic driving technique.

In recent years, various methods that involve utilization of an automatic driving technique, including a vehicle traveling control apparatus, have been proposed and developed for vehicles to allow drivers to drive more comfortably. For example, reference is made to Japanese Unexamined Patent Application Publication (JP-A) No. 2001-97234.

SUMMARY

In general, it is desirable that a vehicle traveling control apparatus correct a disturbance in a vehicle behavior appropriately.

It is desirable to provide a vehicle traveling control apparatus that makes it possible to correct a disturbance in a vehicle behavior appropriately.

An aspect of the technology provides a vehicle traveling control apparatus that includes: a vehicle parameter detector that detects a vehicle parameter; a vehicle parameter estimator that estimates, by means of a vehicle model, a vehicle parameter to be outputted in response to an input value; a disturbance-suppressing parameter calculator that estimates, based on the vehicle parameter detected by the vehicle parameter detector and the vehicle parameter estimated by the vehicle parameter estimator, a disturbance generated at a vehicle, and calculates a disturbance-suppressing parameter that suppresses an influence of the disturbance; an addition rate changer that identifies, based on the vehicle parameter detected by the vehicle parameter detector and the vehicle parameter estimated by the vehicle parameter estimator, the disturbance generated at the vehicle, and variably sets, based on the identified disturbance, an addition rate of the disturbance-suppressing parameter; and a disturbance suppressor that adds the disturbance-suppressing parameter set by the addition rate changer.

BRIEF DESCRIPTION OF THE DRAWINGS

FIG. 6 describes an example of adoption rates of road curvatures set based on environment detection reliability R1 according to one implementation of the technology.

FIG. 7 describes an example of adoption rates of to-lane yaw angles and a to-lane yaw angle feedback gain that are set based on environment detection reliability R2 according to one implementation of the technology.

FIG. 8 describes an example of adoption rates of in-lane lateral positions and an in-lane lateral position angle feedback gain that are set based on environment detection reliability R3 according to one implementation of the technology.

FIG. 11A to FIG. 11D each illustrate an example of the lane information obtained according to one implementation of the technology, in which FIG. 11A illustrates reliability of each of the image information and the map information, FIG. 11B illustrates a steering angle, FIG. 11C illustrates the to-lane yaw angles, and FIG. 11D illustrates the in-lane lateral positions.

DETAILED DESCRIPTION

In the following, some implementations of the technology are described in detail with reference to the accompanying drawings.

Figure 1:
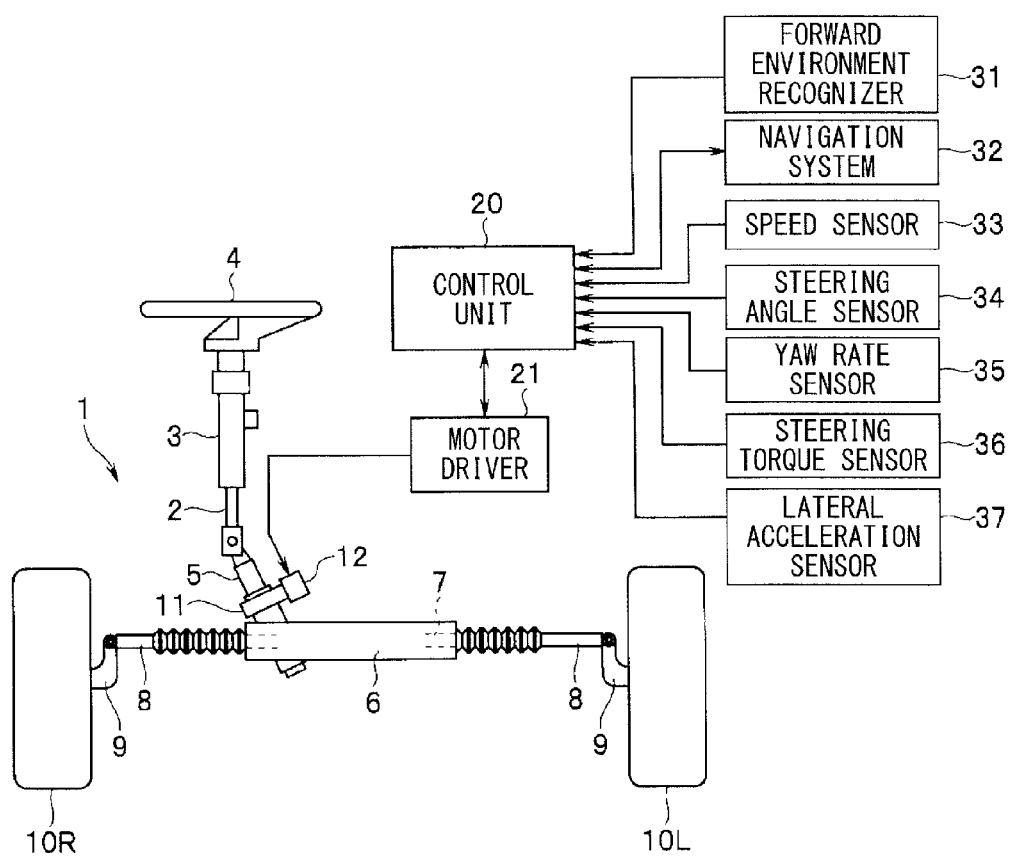
FIG. 1 describes a configuration of a steering system of a vehicle according to one implementation of the technology.

Referring to FIG. 1, an electric power steering apparatus 1 may include a steering shaft 2 rotatably supported by an unillustrated vehicle body frame via steering column 3. The electric power steering apparatus 1 may be allowed to freely set a steering angle independently from an input performed by a driver. The steering shaft 2 may have a first end extending toward a driver's seat and a second end extending toward an engine room. The first end of the steering shaft 2 may be attached with a steering wheel 4, whereas the second end may be coupled to a pinion shaft 5.

The engine room may have a steering gear box 6 that extends in a vehicle width direction. The steering gear box 6 may so support a rack shaft 7, in a manner in which the rack shaft 7 is inserted, as to be slidable axially in a reciprocating fashion. The rack shaft 7 may be formed with an unillustrated rack that is in engagement with a pinion formed on the pinion shaft 5, structuring a rack-and-pinion steering gear mechanism.

Both ends on the right and left sides of the rack shaft 7 may protrude from respective ends of the steering gear box 6, and each may be coupled to a front knuckle 9 via a tie rod 8. The front knuckle 9 may pivotably support corresponding one of right and left wheels 10L and 10R as steered wheels, and may be steerably supported by the unillustrated vehicle body frame. With this configuration, when the steering shaft 2 and the pinion shaft 5 are rotated in response to a driver's operation of the steering wheel 4, the rotation of the pinion shaft 5 may move the rack shaft 7 right and left. The movement of the rack shaft 7 may cause the front knuckles 9 to pivot around respective unillustrated kingpins to steer the right the left wheels 10L and 10R right and left.

The pinion shaft 5 may be coupled to an electric power steering motor (an electric motor) 12 via an assist transmission mechanism 11. The electric motor 12 may allow for assistance of steering torque to be applied to the steering wheel 4, and addition of the steering torque that achieves a set target steering angle. The electric motor 12 may be driven by a motor driver 21. The motor driver 21 may receive information on a control output value from a control unit 20 described below.

The control unit 20 may be coupled to a forward environment recognizer 31 and a navigation system 32. The forward environment recognizer 31 may recognize, based on image information, a forward environment ahead of a vehicle to obtain forward environment information (or "lane information", including information on a three-dimensional object present on a lane). The navigation system 32 may obtain positional information of the own vehicle (such as information on latitude, information on longitude, and information on a traveling direction) to display a position of the own vehicle on map information and to perform a route guidance to a destination. The control unit 20 may also be coupled to a speed sensor 33 that detects a vehicle speed V, a steering angle sensor 34 that detects a steering angle (an actual steering angle) θH, a yaw rate sensor 35 that detects a yaw rate (dΨs/dt) of the vehicle, a steering torque sensor 36 that detects steering torque Td, and a lateral acceleration sensor 37 that detects lateral acceleration Gys.

The forward environment recognizer 31 may include unillustrated cameras each having a solid-state imaging device, etc. The cameras may be provided in a vehicle interior, and each may capture an image of an environment outside the vehicle to obtain the image information. The cameras each may be, for example but not limited to, a stereo camera, a monocular camera, or a color camera.

The forward environment recognizer 31 may perform, for example but not limited to, a grouping process on distance information, based on the image information obtained by each of the cameras. The forward environment recognizer 31 may then compare the distance information having been subjected to the grouping process with three-dimensional road shape data, three-dimensional object data, etc., which are set in advance. By making the comparison, the forward environment recognizer 31 may extract, for example but not limited to: data on lane lines; data on sidewall present along a road such as a guardrail and a curb; and the data on three-dimensional object such as a vehicle including a preceding vehicle, an oncoming vehicle, a vehicle running parallel to the own vehicle, and a parked vehicle. The forward environment recognizer 31 may extract those pieces of data, together with a position relative to the own vehicle and a speed. The relative position may include, for example but not limited to, a distance and an angle. The forward environment recognizer 31 may also detect, based on the image information, whether the lane is under rainy weather condition, snow condition, or any other condition, and may output a result of the detection to the control unit 20. Information on whether the lane is under rainy weather condition, snow condition, or any other condition may alternatively be obtained based on a state of operation of a wiper of the vehicle, based on the Vehicle Information and Communication System or "VICS" (Registered Trademark), or based on a vehicle-to-vehicle communication. Information on any vehicle running parallel to the own vehicle may be obtained by a method other than the use of the image information. The information on any vehicle running parallel to the own vehicle may be obtained based on, for example but not limited to, a vehicle-to-vehicle communication, a radar such as a laser radar or a millimeter-wave radar, and a sonar.

Figure 9:
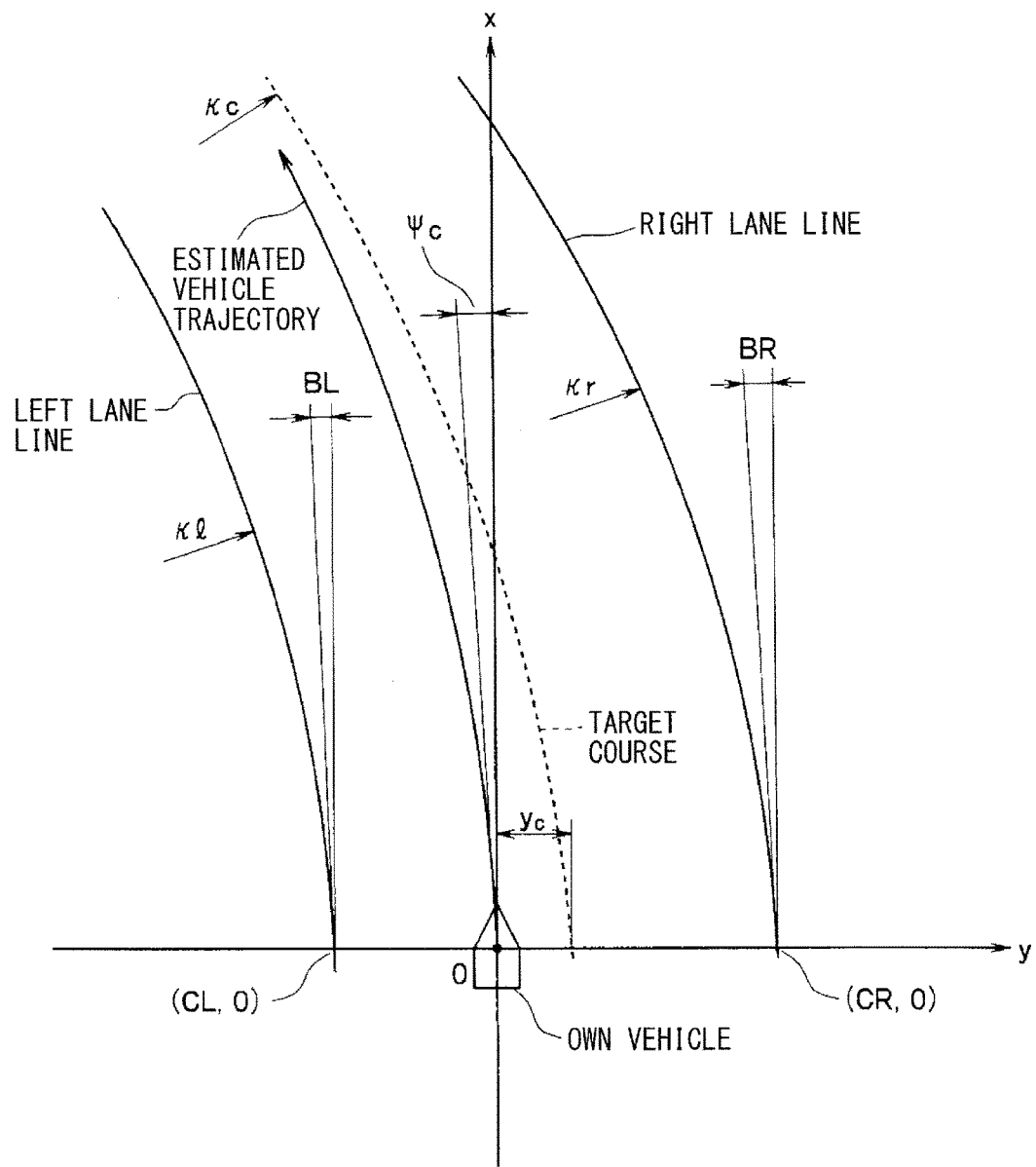
FIG. 9 describes lane information obtained based on image information according to one implementation of the technology.

The forward environment recognizer 31 may perform the following example process to process the image information obtained from each of the cameras, i.e., to obtain the lane information. Referring to FIG. 9, a shift amount between corresponding positions in a pair of stereo images may be obtained. The stereo images may be captured by the respective cameras and directed to a traveling direction of the own vehicle. Based on the thus-obtained shift amount, the distance information may be obtained to generate a distance image.

In recognition of the lane lines such as, but not limited to, white lines, a change in luminance in a width direction of a road may be evaluated on the grounds that the lane lines are higher in luminance than a road surface. By performing the evaluation, positions of the right and the left lane lines in an image plane may be identified on the image plane. Positions in real space (x, y, z) of the lane lines may be calculated by any expression of coordinate transformation, based on the positions (i, j) on the image plane and a parallax calculated from the positions on the image plane, i.e., based on the distance information.

In this implementation, without limitation, a coordinate system in the real space, set based on a position of the own vehicle as a reference, may be defined as follows. As illustrated by way of example in FIG. 9, a vehicle width direction may be a Y axis in which the right is defined as plus (+), a vehicle height direction may be a Z axis in which an upper direction is defined as plus (+), and a vehicle length direction, i.e., a distance direction, may be an X axis in which a forward direction is defined as plus (+), where the road surface immediately below a position in the midpoint of the cameras is defined as the origin O. An X-Y plane where Z equals to zero (0) is coincident with the road surface when the road is flat. A road model may be expressed by dividing, in the distance direction, the lane on the road on which the own vehicle travels into a plurality of sections, approximating the right and the left lane lines in each section in a predetermined way, and coupling those approximated lane lines together.

The forward environment recognizer 31 may execute an approximating process of the obtained right and left lane lines. In one specific but non-limiting example, the left lane line of the own vehicle may be approximated, based on a least-square method, by the following expression (1).

$$y = AL \cdot x^2 + BL \cdot x + CL \tag{1}$$

The right lane line of the own vehicle may be approximated, based on a least-square method, by the following expression (2).

$$y = AR \cdot x^2 + BR \cdot x + CR \tag{2}$$

In the foregoing expressions (1) and (2), "AL" and "AR" denote curvatures of the respective curves. A curvature κl of the left lane line may be 2·AL and a curvature κr of the right lane line may be 2·AR. A curvature κc (a subscript "c" denotes that the factor with "c" is based on the image information) of the lane which is based on the image information may therefore be expressed by the following expression (3).

$$\kappa c = (2 \cdot AL + 2 \cdot AR)/2 = AL + AR \tag{3}$$

In the foregoing expressions (1) and (2), "BL" and "BR" denote inclinations of the respective curves in the width direction of the own vehicle, and "CL" and "CR" denote positions of the respective curves in the width direction of the own vehicle.

Further, the forward environment recognizer 31 may calculate, by the following expression (4), a to-lane yaw angle (i.e., a yaw angle relative to a lane) Ψc that is based on the image information of the own vehicle, and output the calculated to-lane yaw angle Ψc.

$$\Psi c = \tan^{-1}((BL+BR)/2) \quad (4)$$

In this implementation, without limitation, a to-lane lateral position (i.e., a lateral position relative to a lane) yc that is based on the image information may be defined as a position of deviation from the middle of the lane as illustrated in FIG. 9. The middle of the lane may be defined as a target course.

In one implementation of the technology, the forward environment recognizer 31 may serve as a "lane information detector".

The forward environment recognizer 31 may further calculate reliability of the forward environment information (the image information), based on an abundance of a characteristic amount, arranged linearly in an image captured by the cameras, of any lane line (such as, but not limited to, the white line). The lane line is present in process areas, and is determined from any lane in the image. The abundance of the characteristic amount of the lane line where the ideal linear solid lane line is present in the areas is set to 1 (one), whereas the abundance may be determined as 0 (zero) in the complete absence of the characteristic amount or when the characteristic amount is not determinable as being arranged linearly. For example, the reliability of the forward environment information (the image information) may be determined as "high" when the reliability of equal to or greater than a previously-set threshold (such as, but not limited to, 0.8) is calculated, and may be determined as "low" when the reliability of less than the threshold is calculated. The forward environment recognizer 31 may output information on the reliability of the forward environment information (the image information), i.e., reliability information Rc, to the control unit 20 as well.

The navigation system 32 may receive a radio signal from, for example, a global positioning system (GPS) satellite to obtain the positional information of the vehicle (such as the information on latitude and the information on longitude). The navigation system 32 may also obtain the vehicle speed from the speed sensor, and obtain the information on the traveling direction from a sensor such as a geomagnetic sensor and an angular velocity sensor. The navigation system 32 may include a navigation ECU, a map database, and a display which are unillustrated. The navigation ECU may generate route information that allows for a navigation function. The map database stores map information including supplier data and updated data. The display may be a liquid crystal display or any other suitable display.

Figure 10:
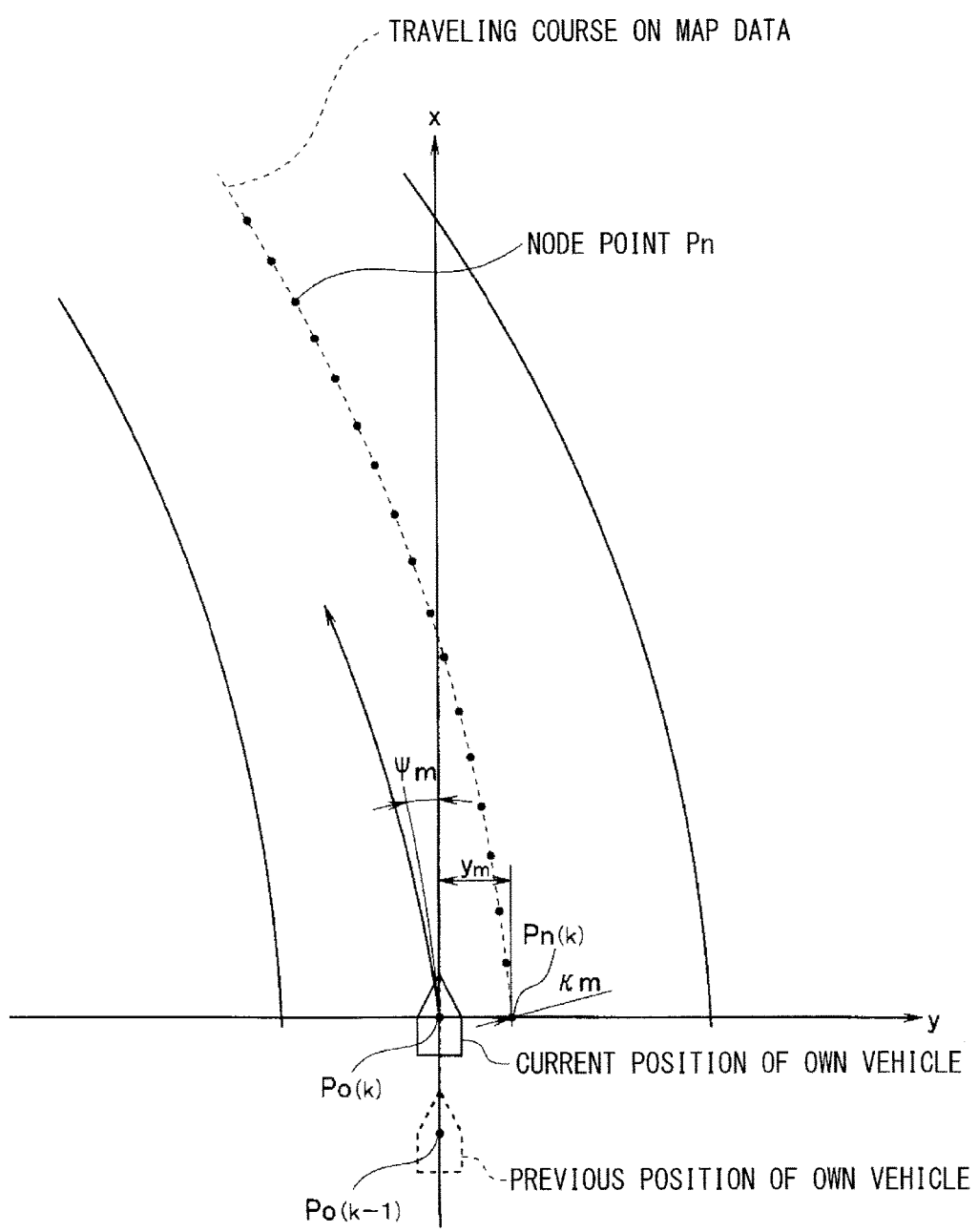
FIG. 10 describes lane information obtained based on map information according to one implementation of the technology.

The navigation ECU may cause the display to display the route information that shows a route to any destination specified by a user. The navigation ECU may also cause the display to display a current position of the vehicle, based on information on the detected position, speed, traveling direction, etc., of the vehicle. The navigation ECU may overlay the route information and the current position of the vehicle on a map image displayed on the display. The map database may store information necessary to configure a road map. The information may include, without limitation, node data and facility data. Referring to FIG. 10, the node data may be related to a position and a shape of a road which configure the map image. The node data may include data on: a coordinate (such as latitude and longitude) of each point (node points Pn) on a road including a fork (an intersection) of a road; a direction and a kind (such as information on whether a road is an expressway, a highway, a local street, etc.) of the road that includes the node points Pn; a type of the road with the node points Pn (such as whether the road with the node points Pn is a straight section, an arc section (or an arc-like curved part), and a clothoid curve section (or a part having relaxation curve)); and a curve curvature κm (or a radius, where a subscript "m" denotes that the factor with "m" is based on the map information). By using the node data, a traveling course of the own vehicle may be identified based on a position on the map on which the current position of the vehicle is overlaid. Further, information on the traveling course may be obtained based on information on a node point Pn(k) that is nearest to a position Po(k) of the own vehicle, where the traveling course of the own vehicle is defined as a target traveling course. The traveling course information may include information on the curve curvature κm (or the radius) of the road and information on a direction of the road. The facility data may include data related to information on a facility located around each node point Pn, and may be so stored as to be associated with the node data or with data on a link at which the corresponding node is present. The navigation system 32 may calculate a to-lane yaw angle Ψm of the vehicle which is based on the map information, and output the calculated to-lane yaw angle Ψm together with a to-lane lateral position ym that is based on the map information. The navigation system 32 may calculate the to-lane yaw angle Ψm, based on a difference between the traveling direction (an angle) of the own vehicle and azimuth of the road. The traveling direction (the angle) may be obtained based on a previous own vehicle position Po(k−1) and the current own vehicle position Po(k). The azimuth of the road may be at the node point Pn(k) that is nearest to the current own vehicle position Po(k). In this implementation, without limitation, the to-lane lateral position ym may be defined as a position of deviation from the middle of the lane as illustrated in FIG. 10. The middle of the lane may be defined as the target course. In one implementation, the navigation system 32 may serve as the "lane information detector". The navigation system 32 may refer to a receiving state of radio waves from the GPS satellite and an updated state of the map information to determine that reliability of the map information is "high" when the receiving state of the radio waves from the GPS satellite is fine and the map information has been updated within a predetermined period. When one of the receiving state of the radio waves from the GPS satellite and the updated state of the map information is impaired, e.g., when the receiving state is bad or the map data is old, the navigation system 32 may determine that the reliability of the map information is "low". The navigation system 32 may output information on the reliability of the map information, i.e., reliability information Rm, to the control unit 20 as well.

The control unit 20 may receive: the forward environment information (or the "lane information", including information on the three-dimensional object present on the lane) obtained by the forward environment recognizer 31; the lane information obtained by the navigation system 32; the vehicle speed V detected by the speed sensor 33; the steering angle θH detected by the steering angle sensor 34; the yaw rate (dΨs/dt) detected by the yaw rate sensor 35; the steering torque Td detected by the steering torque sensor 36; and the lateral acceleration Gys detected by the lateral acceleration sensor 37.

The control unit 20 may vary, based on input values received from the respective devices and sensors mentioned above and in accordance with the reliability of each of the image information and the map information, an adoption rate of the image information and an adoption rate of the map information to thereby obtain the lane information. Further, the control unit 20 may estimate, by means of a two-wheel model of the vehicle, a vehicle behavior to be outputted in response to the received steering angle θH. Based on the estimated vehicle behavior, the control unit 20 may obtain the lane information (including a to-lane yaw angle Ψovs and an in-lane lateral position yovs) that is directed to the lane along which the vehicle travels, and may perform a feedback on the obtained lane information. The control unit 20 may perform the feedback by means of the obtained lane information that has been varied in setting in accordance with the reliability of that obtained lane information. By performing the feedback, the control unit 20 may calculate the feedback-processed lane information as control lane information, and output the calculated control lane information. The control unit 20 may further estimate a disturbance generated at the vehicle, and calculate a disturbance-correcting yaw moment Mzs that suppresses an influence of the disturbance. The control unit 20 may estimate the disturbance, based on the lateral acceleration Gys detected by the lateral acceleration sensor 37 and lateral acceleration Gyovs estimated by the two-wheel model of the vehicle. The control unit 20 may further identify the disturbance generated at the vehicle, and variably set, based on the identified disturbance, a rate limiter R (=ΔMzs/Δt) directed to addition of the disturbance-correcting yaw moment Mzs. The control unit 20 may limit the disturbance-correcting yaw moment Mzs by means of the rate limiter R to output the thus-limited disturbance-correcting yaw moment Mzs. Moreover, the control unit 20 may perform a steering control, based on the control lane information and the disturbance-correcting yaw moment Mzs which are thus outputted.

Figure 2:
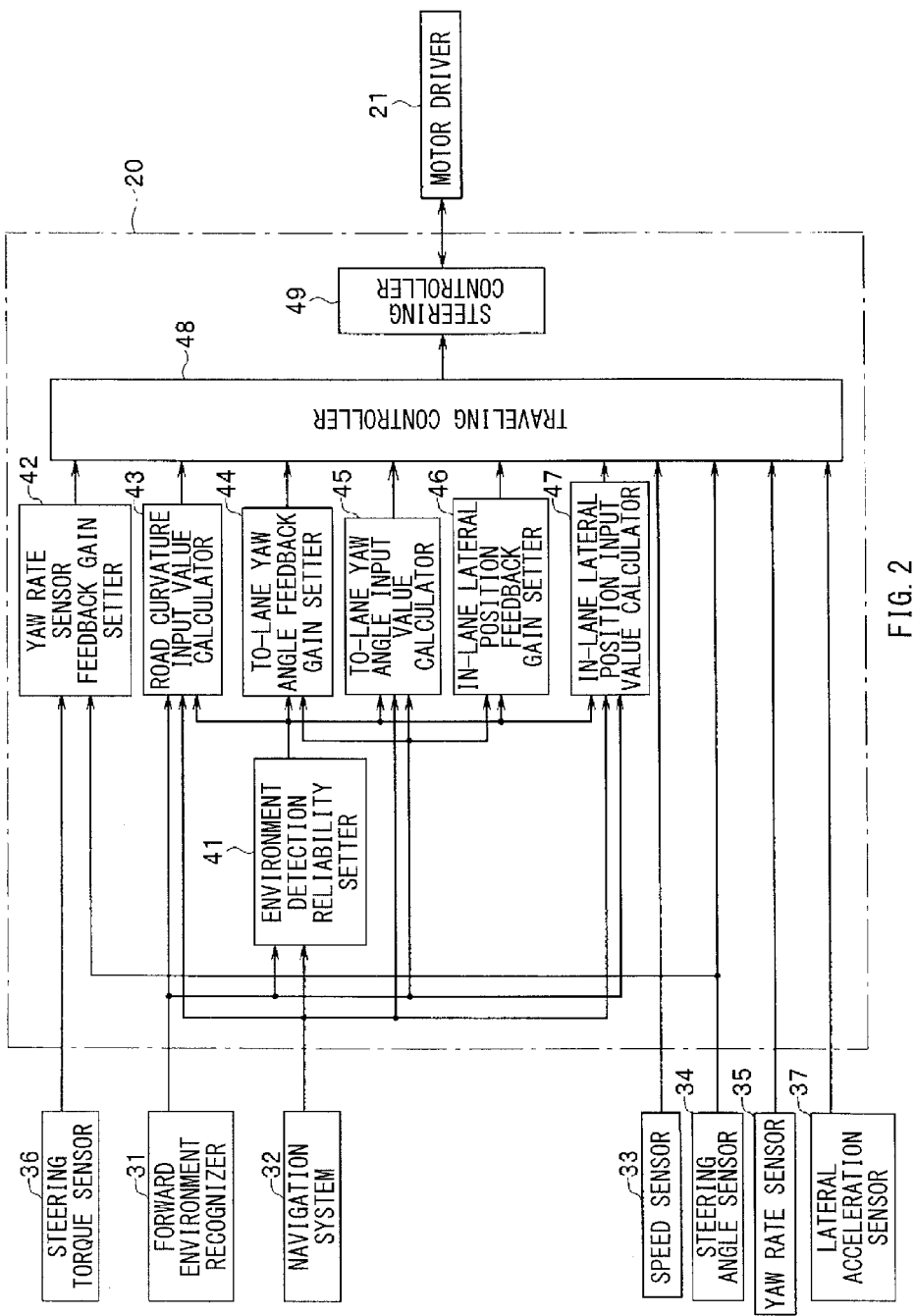
FIG. 2 illustrates functional blocks of a control unit according to one implementation of the technology.

Hence, as illustrated in FIG. 2, the control unit 20 may primarily include, without limitation, an environment detection reliability setter 41, a yaw rate sensor feedback gain setter 42, a road curvature input value calculator 43, a to-lane yaw angle feedback gain setter 44, a to-lane yaw angle input value calculator 45, an in-lane lateral position feedback gain setter 46, an in-lane lateral position input value calculator 47, a traveling controller 48, and a steering controller 49.

The environment detection reliability setter 41 may receive the reliability information Rc on the image information from the forward environment recognizer 31, and receive the reliability information Rm on the map information from the navigation system 32. Further, the environment detection reliability setter 41 may set environment detection reliabilities R1, R2, and R3 in the following example ways in accordance with a combination of the reliability of the image information and that of the map information. The environment detection reliability setter 41 may output the thus-set environment detection reliabilities R1, R2, and R3 to the road curvature input value calculator 43, the to-lane yaw angle feedback gain setter 44, the to-lane yaw angle input value calculator 45, the in-lane lateral position feedback gain setter 46, and the in-lane lateral position input value calculator 47.

The environment detection reliability R1 based on the road curvature may be set in the following example ways.
R1=0 when the reliability of the image information is "low" and the reliability of the map information is "low".
R1=10 when the reliability of the image information is "low" and the reliability of the map information is "high".
R1=20 when the reliability of the image information is "high" and the reliability of the map information is "low".
R1=30 when the reliability of the image information is "high" and the reliability of the map information is "high".

The environment detection reliability R2 based on the to-lane yaw angle may be set in the following example ways.
R2=0 when the reliability of the image information is "low" and the reliability of the map information is "low".
R2=10 when the reliability of the image information is "low" and the reliability of the map information is "high".
R2=20 when the reliability of the image information is "high" and the reliability of the map information is "low".
R2=30 when the reliability of the image information is "high" and the reliability of the map information is "high".

The environment detection reliability R3 based on the in-lane lateral position (i.e., a lateral position in a lane) may be set in the following example ways.
R3=0 when the reliability of the image information is "low" and the reliability of the map information is "low".
R3=10 when the reliability of the image information is "low" and the reliability of the map information is "high".
R3=20 when the reliability of the image information is "high" and the reliability of the map information is "low".
R3=30 when the reliability of the image information is "high" and the reliability of the map information is "high".

In this implementation, the environment detection reliabilities R1 to R3 are set to the same value as each other for the reliability of the image information and the reliability of the map information which are the same among them. For example, in this implementation, R1=R2=R3=0 when the reliability of the image information is "low" and the reliability of the map information is "low". However, in an alternative implementation, the environment detection reliabilities R1 to R3 may be set to values different from each other for the reliability of the image information and the reliability of the map information which are the same among them.

The yaw rate sensor feedback gain setter 42 may receive the steering angle θH from the steering angle sensor 34, and receive the steering torque Td from the steering torque sensor 36. Further, the yaw rate sensor feedback gain setter 42 may determine, when a relationship between the steering torque Td and the steering angle θH as defined by the following expression (5) is not met, that a calculation error may increase in the calculation that is based on the vehicle model employed in this implementation. By making the determination, the yaw rate sensor feedback gain setter 42 may output a signal that increases a yaw rate sensor feedback gain K1 to the traveling controller 48. The signal, in other words, may strengthen an influence of the feedback control that is based on the value of the yaw rate (dΨs/dt) detected by the yaw rate sensor 35.

$$K1L \leq Td/\theta H \leq K1H \quad (5)$$

where K1L and K1H are each a constant determined in advance by experiments, calculation, or other suitable methods.

In one implementation, the yaw rate sensor feedback gain setter 42 may serve as a "feedback amount changer".

The road curvature input value calculator 43 may receive, from the forward environment recognizer 31, the result of the detection as to whether the lane is under rainy weather condition, snow condition, or any other condition and the road curvature κc. The result of the detection and the road curvature κc are based on the image information. The road curvature input value calculator 43 may also receive, from the navigation system 32, the road curvature (the curve curvature) κm that is based on the map information, and receive, from the environment detection reliability setter 41, the environment detection reliability R1 that is based on the road curvature.

Further, the road curvature input value calculator 43 may refer to a table as illustrated by way of example in FIG. 6 to set, based on the environment detection reliability R1 that is based on the road curvature, an adoption rate a1 of the road curvature κc that is based on the image information and an adoption rate a2 of the road curvature κm that is based on the map information.

Thereafter, the road curvature input value calculator 43 may perform a correction as described below on the thus-set adoption rate a1 of the road curvature κc that is based on the image information and the thus-set adoption rate a2 of the road curvature κm that is based on the map information.

The road curvature input value calculator 43 may so correct the adoption rate a1 of the road curvature κc that is based on the image information as to decrease the adoption rate a1 (a1=a1−Δa) and may so correct the adoption rate a2 of the road curvature κm that is based on the map information as to increase the adoption rate a2 (a2=a2+Δa). One reason for performing this correction is that the reliability of the lane recognition based on the image information may become low when the road is under the rainy weather condition, the snow condition, or any other condition. The road curvature input value calculator 43 may further calculate a road curvature input value κmc using the following expression (6), and output the calculated road curvature input value κmc to the traveling controller 48.

$$\kappa mc = \kappa c \cdot a1 + \kappa m \cdot a2 \quad (6)$$

where a1 plus a2 equals 1 (a1+a2=1). As can be appreciated from FIG. 6, the road curvature input value κmc based on the lane information lacks reliability when the environment detection reliability R1 based on the road curvature is 0, i.e., when the reliability of the image information is "low" and the reliability of the map information is "low". Thus, the road curvature input value calculator 43 may refrain from performing the feedback control on the vehicle model. In one implementation, the road curvature input value calculator 43 may serve both as the "lane information detector" and the "feedback amount changer".

The to-lane yaw angle feedback gain setter 44 may receive, from the forward environment recognizer 31, the information on any vehicle running parallel to the own vehicle, and receive, from the environment detection reliability setter 41, the environment detection reliability R2 that is based on the to-lane yaw angle. Further, the to-lane yaw angle feedback gain setter 44 may refer to a table as illustrated by way of example in FIG. 7 to set, based on the environment detection reliability R2 that is based on the to-lane yaw angle, a to-lane yaw angle feedback gain K2.

When the vehicle running parallel to the own vehicle is present on a lane, the to-lane yaw angle feedback gain setter 44 may so correct the to-lane yaw angle feedback gain K2 as to increase the to-lane yaw angle feedback gain K2, i.e., as to strengthen an influence of the feedback control of a to-lane yaw angle Ψmc obtained by the lane information, and output the corrected to-lane yaw angle feedback gain K2 to the traveling controller 48. One reason for performing this correction is that a yaw rate (dΨovs/dt) calculated by the vehicle model in this implementation may contain a disturbance when the vehicle running parallel to the own vehicle is present on the lane. In one implementation, the to-lane yaw angle feedback gain setter 44 may serve as the "feedback amount changer".

The to-lane yaw angle input value calculator 45 may receive, from the forward environment recognizer 31, the result of the detection as to whether the lane is under rainy weather condition, snow condition, or any other condition and the to-lane yaw angle Ψc that is based on the image information. The to-lane yaw angle input value calculator 45 may also receive, from the navigation system 32, the to-lane yaw angle Ψm that is based on the map information, and receive, from the environment detection reliability setter 41, the environment detection reliability R2 that is based on the to-lane yaw angle.

Further, the to-lane yaw angle input value calculator 45 may refer to the table as illustrated by way of example in FIG. 7 to set, based on the environment detection reliability R2 that is based on the to-lane yaw angle, an adoption rate a3 of the to-lane yaw angle Ψc that is based on the image information and an adoption rate a4 of the to-lane yaw angle Ψm that is based on the map information.

Thereafter, the to-lane yaw angle input value calculator 45 may perform a correction as described below on the thus-set adoption rate a3 of the to-lane yaw angle Ψc that is based on the image information and the thus-set adoption rate a4 of the to-lane yaw angle Ψm that is based on the map information.

The to-lane yaw angle input value calculator 45 may so correct the adoption rate a3 of the to-lane yaw angle Ψc that is based on the image information as to decrease the adoption rate a3 (a3=a3−Δa) and may so correct the adoption rate a4 of the to-lane yaw angle Ψm that is based on the map information as to increase the adoption rate a4 (a4=a4+Δa). One reason for performing this correction is that the reliability of the lane recognition based on the image information may become low when the road is under the rainy weather condition, the snow condition, or any other condition. The to-lane yaw angle input value calculator 45 may further calculate the to-lane yaw angle input value Ψmc using the following expression (7), and output the calculated to-lane yaw angle input value Ψmc to the traveling controller 48.

$$\Psi mc = \Psi c \cdot a3 + \Psi m \cdot a4 \quad (7)$$

where a3 plus a4 equals 1 (a3+a4=1). As can be appreciated from FIG. 7, the to-lane yaw angle input value Ψmc based on the lane information lacks reliability when the environment detection reliability R2 based on the to-lane yaw angle is 0, i.e., when the reliability of the image information is "low" and the reliability of the map information is "low". Thus, the to-lane yaw angle input value calculator 45 may refrain from performing the feedback control on the vehicle model. In one implementation, the to-lane yaw angle input value calculator 45 may serve both as the "lane information detector" and the "feedback amount changer".

The in-lane lateral position feedback gain setter 46 may receive, from the forward environment recognizer 31, the information on any vehicle running parallel to the own vehicle, and receive, from the environment detection reliability setter 41, the environment detection reliability R3 that is based on the in-lane lateral position. Further, the in-lane lateral position feedback gain setter 46 may refer to a table as illustrated by way of example in FIG. 8 to set, based on the environment detection reliability R3 that is based on the in-lane lateral position, an in-lane lateral position feedback gain K3.

When the vehicle running parallel to the own vehicle is present on the lane, the in-lane lateral position feedback gain setter 46 may so correct the in-lane lateral position feedback gain K3 as to increase the in-lane lateral position feedback gain K3, i.e., as to strengthen an influence of the feedback control of an in-lane lateral position ymc obtained by the lane information, and output the corrected in-lane lateral position feedback gain K3 to the traveling controller 48. One reason for performing this correction is that the yaw rate (dΨovs/dt) calculated by the vehicle model in this implementation may contain a disturbance when the vehicle running parallel to the own vehicle is present on the lane. In one implementation, the in-lane lateral position feedback gain setter 46 may serve as the "feedback amount changer".

The in-lane lateral position input value calculator 47 may receive, from the forward environment recognizer 31, the result of the detection as to whether the lane is under rainy weather condition, snow condition, or any other condition and the in-lane lateral position yc that are based on the image information. The in-lane lateral position input value calculator 47 may also receive, from the navigation system 32, the in-lane lateral position ym that is based on the map information, and receive, from the environment detection reliability setter 41, the environment detection reliability R3 that is based on the in-lane lateral position.

Further, the in-lane lateral position input value calculator 47 may refer to the table as illustrated by way of example in FIG. 8 to set, based on the environment detection reliability R3 that is based on the in-lane lateral position, an adoption rate a5 of the in-lane lateral position yc that is based on the image information and an adoption rate a6 of the in-lane lateral position ym that is based on the map information.

Thereafter, the in-lane lateral position input value calculator 47 may perform a correction as described below on the thus-set adoption rate a5 of the in-lane lateral position yc that is based on the image information and the thus-set adoption rate a6 of the in-lane lateral position ym that is based on the map information.

The in-lane lateral position input value calculator 47 may so correct the adoption rate a5 of the in-lane lateral position yc that is based on the image information as to decrease the adoption rate a5 (a5=a5−Δa) and may so correct the adoption rate a6 of the in-lane lateral position ym that is based on the map information as to increase the adoption rate a6 (a6=a6+Δa). One reason for performing this correction is that the reliability of the lane recognition based on the image information may become low when the road is under the rainy weather condition, the snow condition, or any other condition. The in-lane lateral position input value calculator 47 may further calculate the in-lane lateral position input value ymc using the following expression (8), and output the calculated in-lane lateral position input value ymc to the traveling controller 48.

$$ymc = yc \cdot a5 + ym \cdot a6 \tag{8}$$

where a5 plus a6 equals 1 (a5+a6=1). As can be appreciated from FIG. 8, the in-lane lateral position input value ymc based on the lane information lacks reliability when the environment detection reliability R3 that is based on the in-lane lateral position is 0, i.e., when the reliability of the image information is "low" and the reliability of the map information is "low". Thus, the in-lane lateral position input value calculator 47 may refrain from performing the feedback control on the vehicle model. In one implementation, the in-lane lateral position input value calculator 47 may serve both as the "lane information detector" and the "feedback amount changer".

The traveling controller 48 may receive the vehicle speed V from the speed sensor 33, the steering angle θH from the steering angle sensor 34, the yaw rate (dΨs/dt) from the yaw rate sensor 35, and the lateral acceleration Gys from the lateral acceleration sensor 37. The traveling controller 48 may also receive the yaw rate sensor feedback gain K1 from the yaw rate sensor feedback gain setter 42, the road curvature input value κmc from the road curvature input value calculator 43, and the to-lane yaw angle feedback gain K2 from the to-lane yaw angle feedback gain setter 44. The traveling controller 48 may further receive the to-lane yaw angle input value Ψmc from the to-lane yaw angle input value calculator 45, the in-lane lateral position feedback gain K3 from the in-lane lateral position feedback gain setter 46, and the in-lane lateral position input value ymc from the in-lane lateral position input value calculator 47.

Then, the traveling controller 48 may estimate, by means of the two-wheel model of the vehicle, the yaw rate (dΨovs/dt) of the vehicle to be outputted in response to the received steering angle θH, and may calculate, based on the estimated yaw rate (dΨovs/dt), the lane information (the to-lane yaw angle Ψovs and the in-lane lateral position yovs) directed to the lane along which the vehicle travels. The traveling controller 48 may perform the feedback of the yaw rate (dΨs/dt), the road curvature input value κmc, the to-lane yaw angle input value Ψmc, and the in-lane lateral position input value ymc on the estimated yaw rate (dΨovs/dt), the to-lane yaw angle Ψovs, and the in-lane lateral position yovs. The traveling controller 48 may perform the feedback using the yaw rate sensor feedback gain K1 that is set based on a driving state of the vehicle, and the to-lane yaw angle feedback gain K2 and the in-lane lateral position feedback gain K3 that are set based on the environment detection reliabilities R2 and R3. By performing the feedback, the traveling controller 48 may calculate the control lane information (the to-lane yaw angle Ψovs and the in-lane lateral position yovs), and output the calculated control lane information to the steering controller 49. The traveling controller 48 may further estimate, based on the lateral acceleration Gys detected by the lateral acceleration sensor 37 and the lateral acceleration Gyovs estimated by the two-wheel model of the vehicle, the disturbance generated at the vehicle, and may calculate the disturbance-correcting yaw moment Mzs that suppresses an influence of the disturbance. The traveling controller 48 may further identify the disturbance generated at the vehicle, and variably set, based on the identified disturbance, the rate limiter R directed to the addition of the disturbance-correcting yaw moment Mzs. The traveling controller 48 may limit the disturbance-correcting yaw moment Mzs by means of the rate limiter R, and output the thus-limited disturbance-correcting yaw moment Mzs to the steering controller 49.

Figure 3:
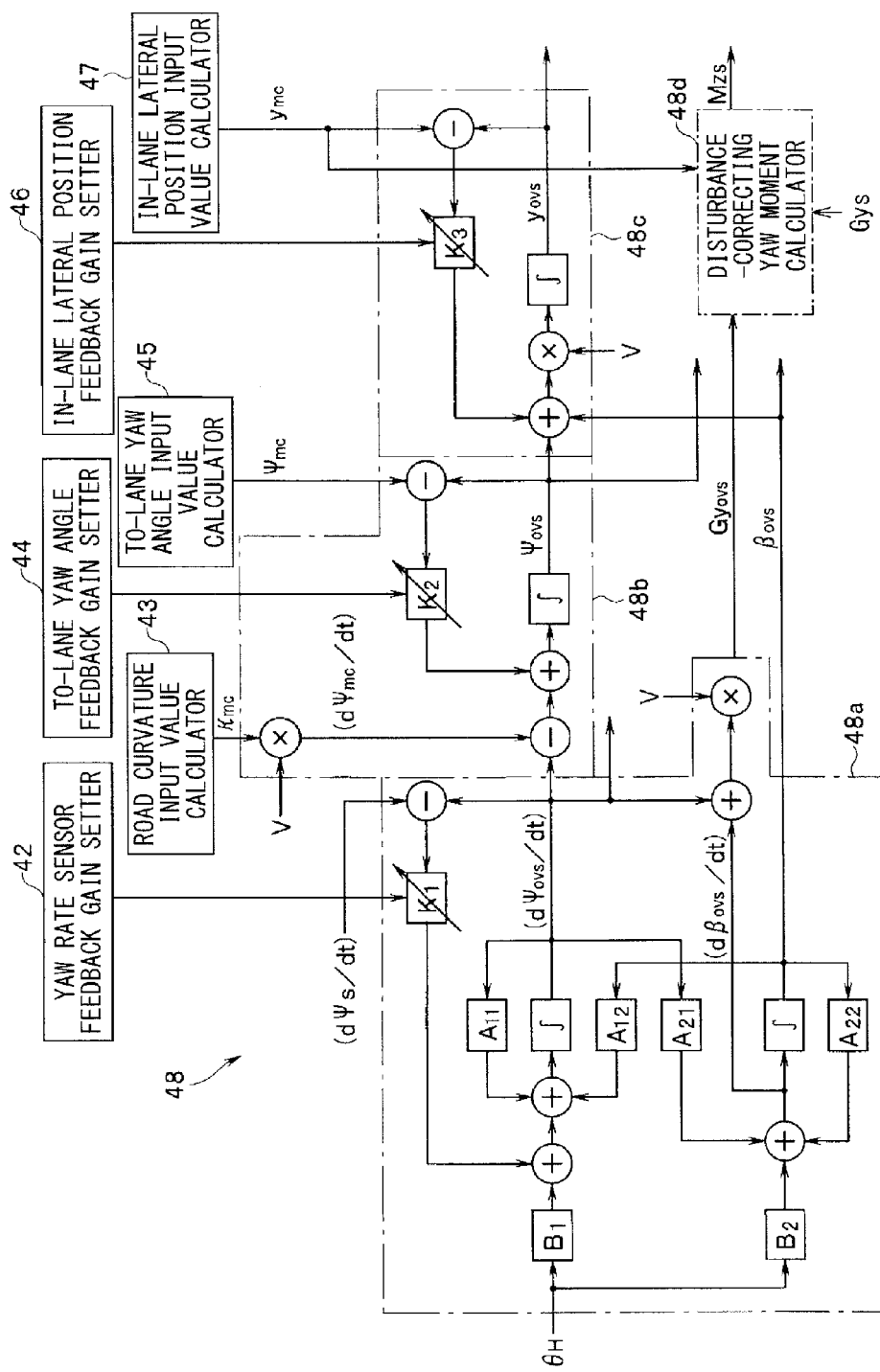
FIG. 3 describes a configuration of a traveling controller according to one implementation of the technology.

Hence, as illustrated in FIG. 3, the traveling controller 48 may primarily include, without limitation, a vehicle behavior estimator 48a, a to-lane yaw angle feedback controller 48b, an in-lane lateral position feedback controller 48c, and a disturbance-correcting yaw moment calculator 48d.

The vehicle behavior estimator 48a may be based on the two-wheel model that is directed to the estimation of the vehicle behavior (the yaw rate (dΨovs/dt), a vehicle body slip angle βovs, and the lateral acceleration Gyovs of the vehicle) to be outputted in response to the received steering angle θH, and may be configured by an observer. In the following, a description is given of a configuration of the observer.

An equation of motion related to a translational motion in a lateral direction of the vehicle may be expressed as follows:

$$2 \cdot Cf + 2 \cdot Cr = M \cdot Gy \tag{9}$$

where Cf is cornering force of any front wheel (single wheel), Cr is cornering force of any rear wheel (single wheel), M is a vehicle body mass, and Gy is lateral acceleration.

An equation of motion related to a rotary motion around a center-of-gravity point may be expressed by the following expression (10):

$$2 \cdot Cf \cdot Lf - 2 \cdot Cr \cdot Lr = Iz \cdot (d^2\Psi/dt^2) \quad (10)$$

where Lf is a distance from the center of gravity to a front axle, Lr is a distance from the center of gravity to a rear axle, Iz is the yaw inertia moment of the vehicle body, and ($d^2\Psi/dt^2$) is yaw angle acceleration.

The lateral acceleration Gy may be expressed as follows:

$$Gy = V \cdot ((d\beta/dt) + (d\Psi/dt)) \quad (11)$$

where β is a vehicle body slip angle, (dβ/dt) is a vehicle body slip angular velocity, and (dΨ/dt) is a yaw rate.

The above expression (9) may therefore be expressed by the following expression (12).

$$2 \cdot Cf + 2 \cdot Cr = M \cdot V \cdot ((d\beta/dt) + (d\Psi/dt)) \quad (12)$$

The cornering force responds to a lateral slip angle of a tire in a manner similar to a primary delay. Each cornering force may therefore be expressed as follows when such a delay in response is ignored and the equivalent cornering power, in which suspension characteristics are incorporated in tire characteristics, is used to linearize the cornering force.

$$Cf = Kf \cdot \alpha f \quad (13)$$

$$Cr = Kr \cdot \alpha r \quad (14)$$

where Kf is the equivalent cornering power of any front wheel, Kr is the equivalent cornering power of any rear wheel, αf is a lateral slip angle of any front wheel, and αr is the lateral slip angle of any rear wheel.

It is to be noted that the equivalent cornering power Kf and the equivalent cornering power Kr each take into consideration influences of roll and suspension. Accordingly, using the equivalent cornering power Kf and the equivalent cornering power Kr makes it possible to simplify the lateral slip angles αf and αr of the front and the rear wheels as follows:

$$\alpha f = \delta f - (\beta + Lf \cdot (d\Psi/dt)/V) = (\theta H/n) - (\beta + Lf \cdot (d\Psi/dt)/V) \quad (15)$$

$$\alpha r = -(\beta - Lr \cdot (d\Psi/dt)/V) \quad (16)$$

where δf is a steering angle of any front or rear wheel, and "n" is a steering gear ratio.

The above equations of motion may be summarized to obtain an equation of state as expressed below by the expression (17). The equation of state may be represented in the form of a configuration of the observer for the vehicle behavior estimator 48a as illustrated in FIG. 3. By the use of the observer, the vehicle behavior (the yaw rate (dΨovs/dt), the vehicle body slip angle βovs, and the lateral acceleration Gyovs) to be generated in response to the received steering angle θH may be estimated.

$$\begin{pmatrix} \left(\dfrac{d^2\Psi}{dt^2}\right) \\ \left(\dfrac{d\beta}{dt}\right) \end{pmatrix} = \begin{pmatrix} A11 & A12 \\ A21 & A22 \end{pmatrix} \begin{pmatrix} \left(\dfrac{d\Psi}{dt}\right) \\ \beta \end{pmatrix} + \begin{pmatrix} B1 \\ B2 \end{pmatrix} \cdot \dfrac{\theta H}{n} \quad (17)$$

where $$A11 = -2 \cdot (Lf^2 \cdot Kf + Lr^2 \cdot Kr)/(Iz \cdot V)$$

$$A12 = -2 \cdot (Lf \cdot Kf - Lr \cdot Kr)/Iz$$

$$A21 = (-2 \cdot (Lf \cdot Kf - Lr \cdot Kr)/(M \cdot V^2)) - 1$$

$$A22 = -2 \cdot (Kf + Kr)/(M \cdot V)$$

$$B1 = 2 \cdot Lf \cdot Kf/Iz$$

$$B2 = 2 \cdot Kf/(M \cdot V)$$

Accordingly, the vehicle behavior estimator 48a may receive the vehicle speed V from the speed sensor 33, the steering angle θH from the steering angle sensor 34, the yaw rate (dΨs/dt) from the yaw rate sensor 35, and the yaw rate sensor feedback gain K1 from the yaw rate sensor feedback gain setter 42.

Further, the vehicle behavior estimator 48a may perform the feedback control on the yaw rate (dΨovs/dt) calculated from the foregoing expression (17), based on the yaw rate (dΨs/dt) obtained from the yaw rate sensor 35. Here, the yaw rate sensor feedback gain K1 that determines an amount of the feedback may be so set that the yaw rate sensor feedback gain K1 is increased (the influence of the feedback control that is based on the value of the yaw rate (dΨs/dt) detected by the yaw rate sensor 35 is strengthened) when the determination is made that the calculation error may increase in the calculation that is based on the vehicle model employed in this implementation as described above. Hence, an accuracy of the yaw rate (dΨovs/dt) calculated by the vehicle behavior estimator 48a is allowed to be maintained favorably. It is to be noted that the lateral acceleration Gyovs may be calculated from, for example, the foregoing expression (11) by the vehicle behavior estimator 48a.

The yaw rate (dΨovs/dt) thus calculated by the vehicle behavior estimator 48a may be outputted to the to-lane yaw angle feedback controller 48b. Similarly, the vehicle body slip angle βovs and the lateral acceleration Gyovs thus calculated by the vehicle behavior estimator 48a may be outputted respectively to the in-lane lateral position feedback controller 48c and the disturbance-correcting yaw moment calculator 48d. In one implementation, the vehicle behavior estimator 48a may serve as a "vehicle parameter estimator".

The to-lane yaw angle feedback controller 48b may receive the vehicle speed V from the speed sensor 33, the road curvature input value κmc from the road curvature input value calculator 43, and the to-lane yaw angle feedback gain K2 from the to-lane yaw angle feedback gain setter 44. The to-lane yaw angle feedback controller 48b may also receive the to-lane yaw angle input value Ψmc from the to-lane yaw angle input value calculator 45 and the yaw rate (dΨovs/dt) from the vehicle behavior estimator 48a.

Further, the to-lane yaw angle feedback controller 48b may multiply the road curvature input value κmc obtained from the road curvature input value calculator 43 by the vehicle speed V, to calculate a yaw rate (dΨmc/dt) that is based on the road curvature input value κmc. As described above, the road curvature input value κmc has been calculated with favorable accuracy, based on the reliability of the image information and the reliability of the map information. Hence, a value that involves favorable accuracy is allowed to be obtained for the yaw rate (dΨmc/dt) that is based on the road curvature input value κmc accordingly.

A difference between the yaw rate (dΨmc/dt) that is based on the road curvature input value κmc and the yaw rate (dΨovs/dt) obtained from the vehicle behavior estimator 48a corresponds to the yaw rate with respect to the lane. The difference may be integrated to calculate the to-lane yaw angle Ψovs.

The to-lane yaw angle feedback controller 48b may perform the feedback control on the to-lane yaw angle Ψovs thus calculated as described above, based on the to-lane yaw angle input value Ψmc obtained from the to-lane yaw angle input value calculator 45. The to-lane yaw angle feedback controller 48*b* may thereafter output the feedback-processed to-lane yaw angle Ψovs to the in-lane lateral position feedback controller 48*c*. As described above, the to-lane yaw angle input value Ψmc obtained from the to-lane yaw angle input value calculator 45 has been calculated with favorable accuracy, based on the reliability of the image information and the reliability of the map information. Hence, a value that involves favorable accuracy is allowed to be obtained for the to-lane yaw angle Ψovs accordingly.

Further, as described above, the to-lane yaw angle feedback gain K2 that determines an amount of the feedback may be set based on the environment detection reliability R2 that is based on the to-lane yaw angle, and may be thus set to be small in amount when the reliability of the image information and the reliability of the map information are both low. In addition, the to-lane yaw angle feedback gain K2 may be corrected depending on the presence on the lane of the vehicle that runs parallel to the own vehicle. More specifically, the to-lane yaw angle feedback gain K2 may be so corrected that the to-lane yaw angle feedback gain K2 is increased, in consideration of the possibility that the yaw rate (dΨovs/dt) calculated by the vehicle model in this implementation may contain a disturbance when the vehicle running parallel to the own vehicle is present on the lane. Hence, an accuracy of the to-lane yaw angle Ψovs calculated by the to-lane yaw angle feedback controller 48*b* is allowed to be maintained favorably. In one implementation, the to-lane yaw angle feedback controller 48*b* may serve as a "control lane information calculator".

The in-lane lateral position feedback controller 48*c* may receive the vehicle speed V from the speed sensor 33, the in-lane lateral position feedback gain K3 from the in-lane lateral position feedback gain setter 46, and the in-lane lateral position input value ymc from the in-lane lateral position input value calculator 47. The in-lane lateral position feedback controller 48*c* may also receive the vehicle body slip angle βovs from the vehicle behavior estimator 48*a* and the to-lane yaw angle Ψovs from the to-lane yaw angle feedback controller 48*b*.

Further, the in-lane lateral position feedback controller 48*c* may add the vehicle body slip angle βovs and the to-lane yaw angle Ψovs, and multiply a resultant of the addition by the vehicle speed V. The in-lane lateral position feedback controller 48*c* may further integrate a resultant of the multiplication to calculate the in-lane lateral position yovs.

The in-lane lateral position feedback controller 48*c* may perform the feedback control on the in-lane lateral position yovs thus calculated as described above, based on the in-lane lateral position input value ymc obtained from the in-lane lateral position input value calculator 47. The in-lane lateral position feedback controller 48*c* may thereafter output the feedback-processed in-lane lateral position yovs. As described above, the in-lane lateral position input value ymc obtained from the in-lane lateral position input value calculator 47 has been calculated with favorable accuracy, based on the reliability of the image information and the reliability of the map information. Hence, a value that involves favorable accuracy is allowed to be obtained for the in-lane lateral position yovs accordingly.

Further, as described above, the in-lane lateral position feedback gain K3 that determines an amount of the feedback may be set based on the environment detection reliability R3 that is based on the in-lane lateral position, and may be thus set to be small in amount when the reliability of the image information and the reliability of the map information are both low. In addition, the in-lane lateral position feedback gain K3 may be corrected depending on the presence on the lane of the vehicle that runs parallel to the own vehicle. More specifically, the in-lane lateral position feedback gain K3 may be so corrected that the in-lane lateral position feedback gain K3 is increased, in consideration of the possibility that the yaw rate (dΨovs/dt) calculated by the vehicle model in this implementation may contain a disturbance when the vehicle running parallel to the own vehicle is present on the lane. Hence, an accuracy of the in-lane lateral position yovs calculated by the in-lane lateral position feedback controller 48*c* is allowed to be maintained favorably. In one implementation, the in-lane lateral position feedback controller 48*c* may serve as the "control lane information calculator".

The disturbance-correcting yaw moment calculator 48*d* may receive the lateral acceleration Gys from the lateral acceleration sensor 37, the in-lane lateral position ymc from the in-lane lateral position input value calculator 47, and the lateral acceleration Gyovs from the vehicle behavior estimator 48*a*. In one implementation, the lateral acceleration sensor 37 may serve as a "vehicle parameter detector".

Further, in accordance with a flowchart of a disturbance-correcting yaw moment calculation routine to be described later with reference to FIG. 5, the disturbance-correcting yaw moment calculator 48*d* may estimate, based on the lateral acceleration Gys detected by the lateral acceleration sensor 37 and the lateral acceleration Gyovs estimated by the two-wheel model of the vehicle, the disturbance generated at the vehicle to calculate the disturbance-correcting yaw moment Mzs that suppresses an influence of the disturbance, and may further identify the disturbance generated at the vehicle. The disturbance-correcting yaw moment calculator 48*d* may variably set, based on the identified disturbance, the rate limiter R directed to the addition of the disturbance-correcting yaw moment Mzs, and may limit the disturbance-correcting yaw moment Mzs by means of the rate limiter R to output a disturbance-correcting yaw moment Mzs(i) to the steering controller 49. The reference sign "(i)" in the disturbance-correcting yaw moment Mzs(i) denotes that the disturbance-correcting yaw moment Mzs(i) is the current disturbance-correcting yaw moment Mzs limited by the rate limiter R and to be outputted to the steering controller 49. In one implementation, the disturbance-correcting yaw moment calculator 48*d* may serve as a "disturbance-suppressing parameter calculator" and an "addition rate changer".

The steering controller 49 may receive pieces of information through the traveling controller 48. The pieces of information may include, without limitation, the vehicle speed V, the steering angle θH, the yaw rate (dΨs/dt), the road curvature input value κmc, the to-lane yaw angle input value Ψmc, the in-lane lateral position input value ymc, the yaw rate (dΨovs/dt), the vehicle body slip angle βovs, the to-lane yaw angle Ψovs, the in-lane lateral position yovs, and the disturbance-correcting yaw moment Mzs(i).

Further, the steering controller 49 may calculate a target steering angle θt from, for example, the following expression (18):

$$\theta t = Gf\!f \cdot \kappa mc + Gfb \cdot (yovs - yt) + Gfby \cdot (\Psi ovs - \Psi t) + Gzs \cdot Mzs \quad (18)$$

where Gff, Gfb, Gfby, and Gzs are each a previously-set constant, yt is a target value of the in-lane lateral position of the target course along which a follow-up travel control is to be performed, and Ψt is a target value of the to-lane yaw angle relative to the target course along which the follow-up travel control is to be performed. The steering controller 49 may output the calculated target steering angle θt to the motor driver 21. The to-lane yaw angle Ψovs and the in-lane lateral position yovs as defined in the present implementation each may be set to 0 (zero) when the middle of the lane is defined as the target course and the vehicle is to travel substantially parallel to the lane. Note that "+Gzs·Mzs(i)" in the expression (18) is the operation term directed to the addition of the disturbance-correcting yaw moment Mzs(i) that suppresses the disturbance.

In one implementation, the steering controller 49 may serve as a "disturbance suppressor (steering controller)".

Figure 4:
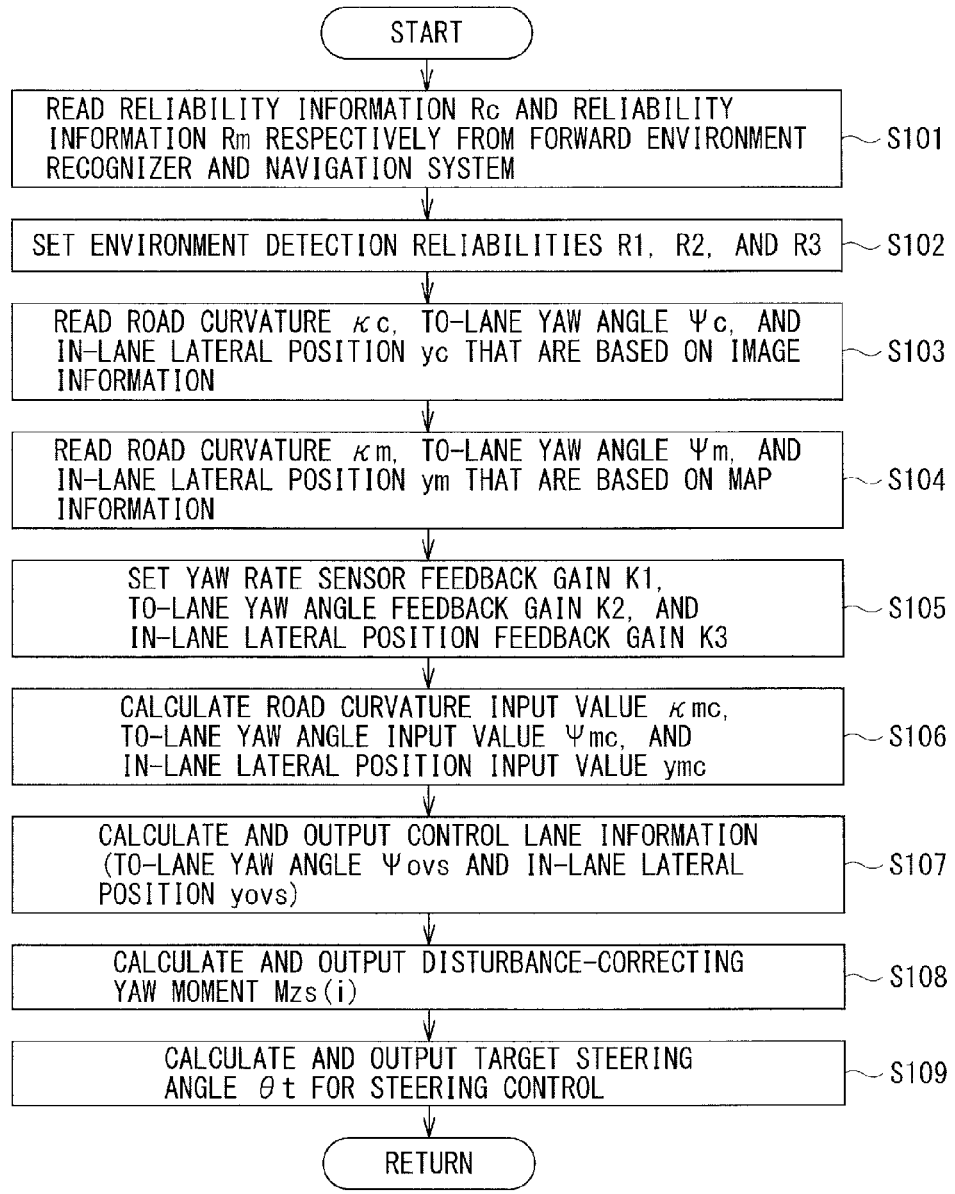
FIG. 4 is a flowchart of a steering control program according to one implementation of the technology.

Next, a description is given, based on the flowchart illustrated in FIG. 4, of the steering control to be executed by the control unit 20 described above.

First, in step (abbreviated as "S" hereinafter) 101, the environment detection reliability setter 41 may read the reliability information Rc and the reliability information Rm outputted respectively from the forward environment recognizer 31 and the navigation system 32.

Thereafter, the flow may proceed to S102 where the environment detection reliability setter 41 may set the environment detection reliabilities R1, R2, and R3 in accordance with a combination of the reliability of the image information and that of the map information.

Thereafter, the flow may proceed to S103 where the road curvature input value calculator 43 may read the road curvature κc, the to-lane yaw angle input value calculator 45 may read the to-lane yaw angle Ψc, and the in-lane lateral position input value calculator 47 may read the in-lane lateral position yc. The road curvature κc, the to-lane yaw angle Ψc, and the in-lane lateral position yc read here may be those that are based on the image information.

Thereafter, the flow may proceed to S104 where the road curvature input value calculator 43 may read the road curvature κm, the to-lane yaw angle input value calculator 45 may read the to-lane yaw angle Ψm, and the in-lane lateral position input value calculator 47 may read the in-lane lateral position ym. The road curvature κm, the to-lane yaw angle Ψm, and the in-lane lateral position ym read here may be those that are based on the map information.

Thereafter, the flow may proceed to S105 where the yaw rate sensor feedback gain setter 42 may set the yaw rate sensor feedback gain K1 in accordance with the steering characteristics expressed by the foregoing expression (5). In addition, the to-lane yaw angle feedback gain setter 44 may refer to the table as illustrated by way of example in FIG. 7 to set the to-lane yaw angle feedback gain K2, based on the environment detection reliability R2 that is based on the to-lane yaw angle. Further, the in-lane lateral position feedback gain setter 46 may refer to the table as illustrated by way of example in FIG. 8 to set the in-lane lateral position feedback gain K3, based on the environment detection reliability R3 that is based on the in-lane lateral position.

Thereafter, the flow may proceed to S106 where the road curvature input value calculator 43 may calculate the road curvature input value κmc using the foregoing expression (6), the to-lane yaw angle input value calculator 45 may calculate the to-lane yaw angle input value Ψmc using the foregoing expression (7), and the in-lane lateral position input value calculator 47 may calculate the in-lane lateral position input value ymc using the foregoing expression (8).

Thereafter, the flow may proceed to S107 where the traveling controller 48 may calculate the control lane information (the to-lane yaw angle Ψovs and the in-lane lateral position yovs).

Thereafter, the flow may proceed to S108 where the disturbance-correcting yaw moment calculator 48d may calculate the disturbance-correcting yaw moment Mzs(i) in accordance with a flowchart of a disturbance-correcting yaw moment calculation routine to be described later with reference to FIG. 5.

Thereafter, the flow may proceed to S109 where the steering controller 49 may calculate the target steering angle θt from, for example, the foregoing expression (18), and output the calculated target steering angle θt to the motor driver 21. Note that parameters to be used for the steering control may be read from the traveling controller 48, etc., on an as-needed basis.

Figure 5:
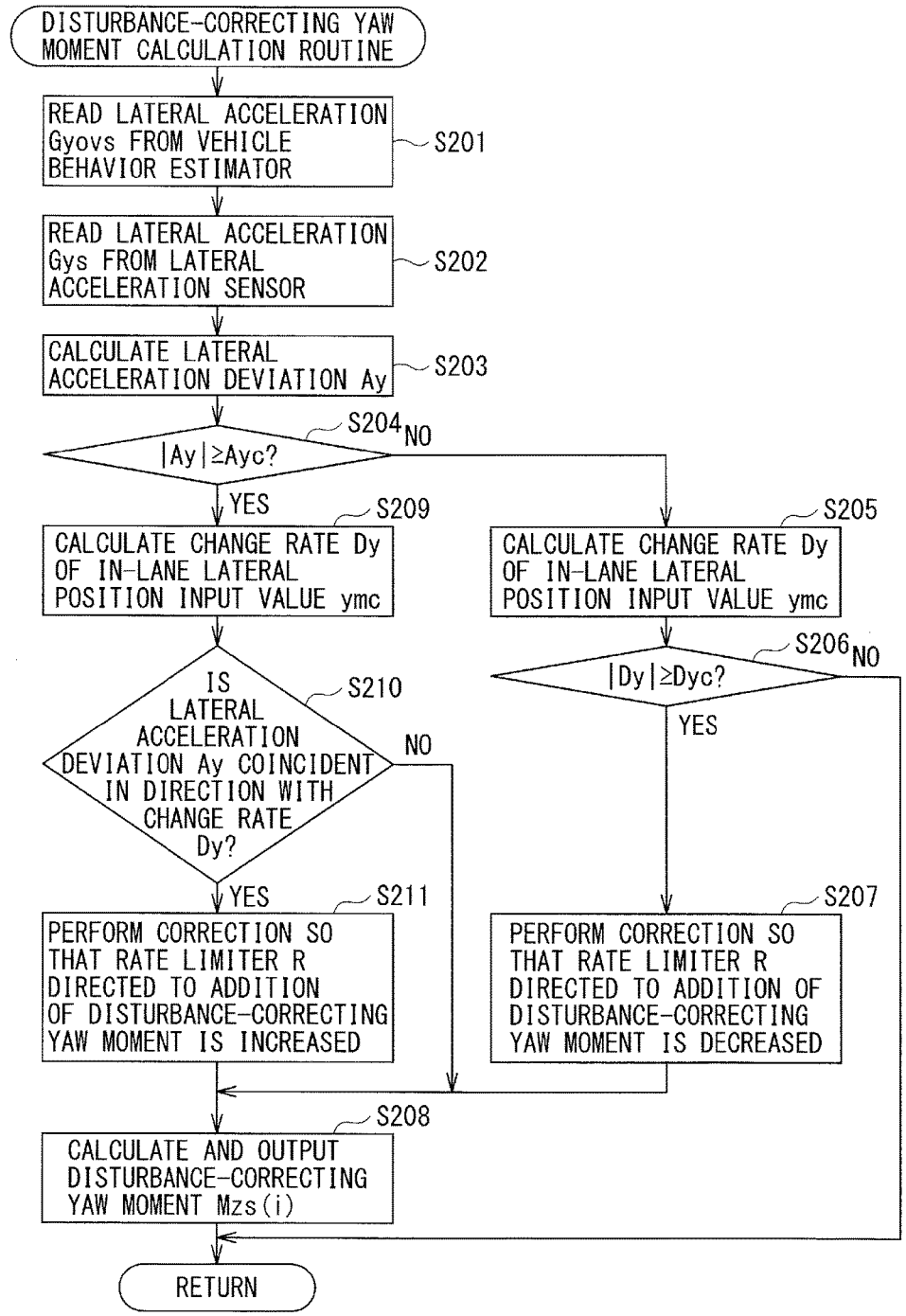
FIG. 5 is a flowchart of a disturbance-correcting yaw moment calculation routine according to one implementation of the technology.

Next, a description is given, based on the flowchart illustrated in FIG. 5, of S108, i.e., the disturbance-correcting yaw moment calculation routine to be performed by the disturbance-correcting yaw moment calculator 48d.

First, in S201, the lateral acceleration Gyovs estimated based on the two-wheel model of the vehicle may be read from the vehicle behavior estimator 48a.

Thereafter, the flow may proceed to S202 where the lateral acceleration Gys detected by the lateral acceleration sensor 37 may be read from the lateral acceleration sensor 37.

Thereafter, the flow may proceed to S203 where a lateral acceleration deviation Ay (=Gys−Gyovs) is calculated.

Thereafter, the flow may proceed to S204 where an absolute value |Ay| of the lateral acceleration deviation may be compared with a threshold Ayc. The threshold Ayc may be set in advance by experiments, calculation, or other suitable methods.

Based on a result of the comparison, when the absolute value |Ay| of the lateral acceleration deviation is less than the threshold Ayc (when |Ay|<Ayc), the flow may proceed to S205 by determining that the vehicle possibly travels on a canted road surface. In S205, a change rate Dy of the in-lane lateral position input value ymc may be calculated.

The flow may proceed to S206 after the change rate Dy of the in-lane lateral position input value ymc is calculated in S205. In S206, an absolute value |Dy| of the change rate of the in-lane lateral position input value may be compared with a threshold Dyc. The threshold Dyc may be set in advance by experiments, calculation, or other suitable methods.

Based on a result of the determination made in S206, when the absolute value |Dy| of the change rate of the in-lane lateral position input value is less than the threshold Dyc (when |Dy|<Dyc), the routine may be finished directly by determining that no disturbance to be corrected occurs on the vehicle.

When the absolute value |Dy| of the change rate of the in-lane lateral position input value is equal to or greater than the threshold Dyc (when |Dy|≥Dyc), the flow may proceed to S207 by determining that the vehicle possibly travels on the canted road surface and that there is a possible occurrence of the disturbance resulting from the traveling on the canted road surface. In S207, the rate limiter R directed to the addition of the disturbance-correcting yaw moment may be so corrected as to be decreased. The rate limiter R may be a value (i.e., ΔMzs/Δt) that limits a rate of the addition of the disturbance-correcting yaw moment Mzs(i) to be calculated in the later-described process in S208. Reducing the rate limiter R by the correction causes the rate of the addition of the disturbance-correcting yaw moment Mzs(i) to be corrected gently. One reason for correcting the rate of the addition of the disturbance-correcting yaw moment Mzs(i) gently is that a disturbance acting on the vehicle upon the traveling on the canted road surface acts gently on the vehicle, and is thus to take into consideration a way in which such a disturbance acts on the vehicle.

Thereafter, the flow may proceed to S208 where the disturbance-correcting yaw moment Mzs(i) may be calculated and outputted as a disturbance-suppressing parameter that suppresses the influence of the disturbance. The disturbance-correcting yaw moment Mzs(i) may be calculated from, for example, the following expression (19):

$$Mzs(i)=Min(\Delta t \cdot R+Mzs(i-1),Mzs(k)) \qquad (19)$$

where Min($\alpha$, $\beta$) is a Min function for $\alpha$ and $\beta$, $\Delta t$ is a control period, Mzs(i−1) is a previous value of the disturbance-correcting yaw moment Mzs(i), and Mzs(k) is a current value of the disturbance-correcting yaw moment Mzs(k).

The current value Mzs(k) of the disturbance-correcting yaw moment in the Min function in the expression (19) may be calculated from, for example, the following expression (20):

$$Mzs(k)=(1+A \cdot V^2) \cdot (2 \cdot L^2 \cdot Kf \cdot Kr)/(V \cdot (Kf+Kr)) \cdot K \cdot Dy \qquad (20)$$

where L is a wheelbase, and K is a control gain directed to the change rate of the lateral position, i.e., a lateral-position-change-rate-sensitive control gain, which is set in advance by experiments, calculation, or other suitable methods.

Based on a result of the comparison in S204, when the absolute value |Ay| of the lateral acceleration deviation is equal to or greater than the threshold Ayc (when |Ay|≥Ayc), the flow may proceed to S209 by determining that a disturbance attributed to wandering possibly acts on the vehicle. The wandering is a disturbance in vehicle behavior attributable to irregularity of the road surface, to a rutted path, or to any other factor. In S209, the change rate Dy of the in-lane lateral position input value ymc may be calculated.

The flow may proceed to S210 after the change rate Dy of the in-lane lateral position input value ymc is calculated in S209. In S210, a direction of the lateral acceleration deviation Ay may be compared with a direction of the change rate Dy of the in-lane lateral position input value ymc.

Based on a result of the determination made in S210, when the direction of the lateral acceleration deviation Ay is coincident with the direction of the change rate Dy of the in-lane lateral position input value ymc, the flow may proceed to S211 by determining that the disturbance to be suppressed (e.g., the wandering) acts on the vehicle. In S211, the rate limiter R directed to the addition of the disturbance-correcting yaw moment may be so corrected as to be increased. One reason for increasing the rate limiter R is that the disturbance such as the wandering is fast in motion and thus requires a quick control operation, and is therefore to allow for a prompt correction by means of the disturbance-correcting yaw moment Mzs(i).

When the direction of the lateral acceleration deviation Ay is not coincident with the direction of the change rate Dy of the in-lane lateral position input value ymc, the flow may proceed directly to S208 without correcting the rate limiter R. In S208, the disturbance-correcting yaw moment Mzs(i) may be calculated and outputted as the disturbance-suppressing parameter that suppresses the influence of the disturbance. The disturbance-correcting yaw moment Mzs(i) may be calculated from the foregoing expression (19).

Next, a description is given, based on a time chart illustrated in FIGS. 11A to 11D, of an example of the lane information obtained in one implementation of the technology.

Figure 11A:
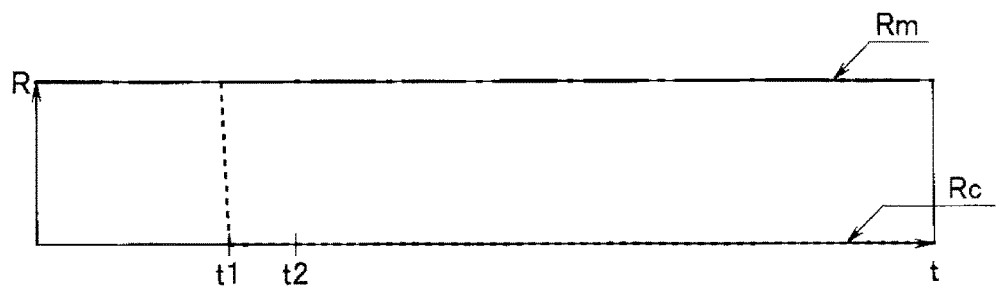
Figure 11B:
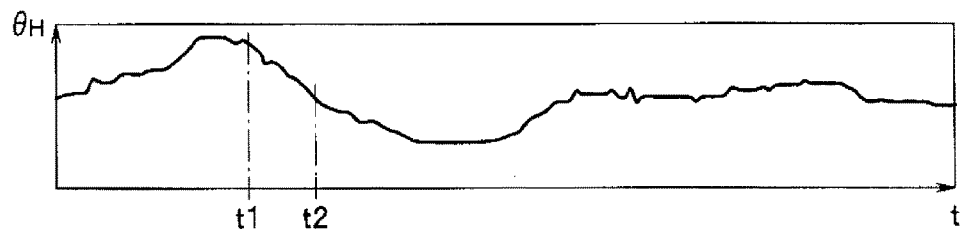

FIG. 11A illustrates the reliability information Rc on the image information and the reliability information Rm on the map information. FIG. 11A illustrates one example in which the reliability information Rc on the image information and the reliability information Rm on the map information are both 1 (one) up to time t1, and the reliability information Rc on the image information drops down to substantially 0 (zero) from the time t1. The reliability information Rm on the map information remains 1 continuously from the time t1.

Hence, in the pieces of lane information to be employed from the time t1, the lane information based on the map information is increased in the adoption rate as compared with the lane information based on the image information.

Figure 11C:
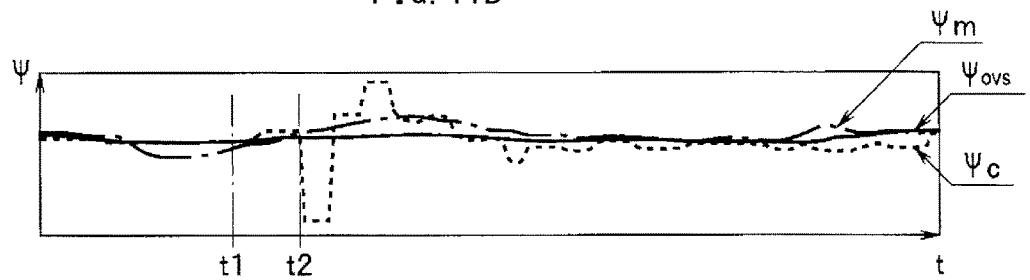
Figure 11D:
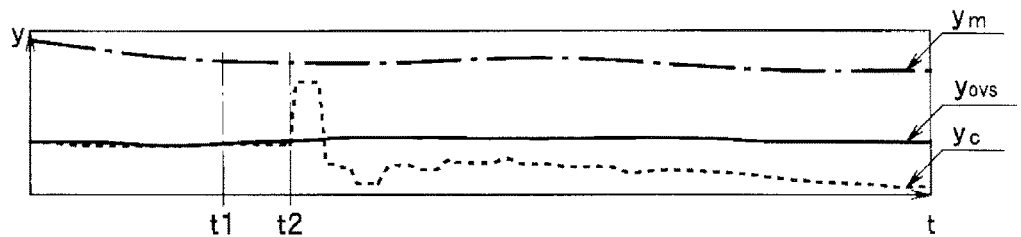

Accordingly, as illustrated in the time chart of FIG. 11C that represents the to-lane yaw angles Ψ and the time chart of FIG. 11D that represents the in-lane lateral positions y, a disturbance appears on a signal related to the to-lane yaw angle Ψc based on the image information and on a signal related to the in-lane lateral position yc based on the image information at the time t2 following the time t1. In contrast, no disturbance appears on a signal related to the to-lane yaw angle Ψm based on the map information and on a signal related to the in-lane lateral position ym based on the map information at the time t2. This allows the feedback control to be performed on the two-wheel model of the vehicle, by means of the accurate lane information in which the adoption rate is increased for the lane information that is based on the map information. Hence, a signal related to the to-lane yaw angle Ψovs obtained based on the two-wheel model of the vehicle and a signal related to the in-lane lateral position yovs that is based on the image information are allowed to be maintained favorably without involving any unnatural fluctuation.

According to the present implementation of the technology, the adoption rate of the image information and the adoption rate of the map information may be varied in accordance with the reliability of each of the image information and the map information to obtain the lane information. In addition, the vehicle behavior to be outputted in response to the received steering angle θH may be estimated by means of the two-wheel model of the vehicle. Based on the estimated vehicle behavior, the feedback may be performed on the lane information (the to-lane yaw angle Ψovs and the in-lane lateral position yovs) directed to the lane along which the vehicle travels, by means of the obtained lane information that has been varied in setting in accordance with the reliability of that obtained lane information. By performing the feedback, the thus-feedback-processed lane information may be calculated as the control lane information, and the steering control may be performed based on the calculated control lane information.

Hence, the input values having been set with favorable accuracy in accordance with the adoption rates that are appropriate to states of the image information and the map information are obtained, and the feedback is performed on the two-wheel model of the vehicle by means of those favorably-set input values, making it possible to obtain the control lane information that involves favorable accuracy. At this time, the adoption rates of the image information and the map information are also variably set and corrected appropriately based on a state of the environment under which the vehicle travels (such as rainy weather condition and snow condition), making it possible to obtain the control lane information that involves favorable accuracy. The amount of the feedback of the input values of the lane information to be performed on the two-wheel model is also variably set based on the reliability of the lane information, making it possible to maintain the feedback control performed based on that two-wheel model favorably. Further, upon performing the feedback control that is based on that two-wheel model configured by the observer, the amount of the feedback of the detection values of the vehicle behavior is so variably set as to increase the amount of the feedback when it is determinable from the steering characteristics of the vehicle that the vehicle behavior may not be estimated favorably by that two-wheel model, making it possible to reduce an error resulting from the two-wheel model. The amount of the feedback of the input values of the lane information is increased when it is estimated that estimation values obtained by the two-wheel model of the vehicle contains a disturbance, such as when the vehicle running parallel to the own vehicle is present on the lane, making it possible to obtain the control lane information that involves favorable accuracy. Further, based on the lateral acceleration Gys detected by the lateral acceleration sensor 37 and the lateral acceleration Gyovs estimated by the two-wheel model of the vehicle, a disturbance generated at the vehicle is estimated to calculate, with favorable accuracy, the disturbance-correcting yaw moment Mzs that suppresses an influence of the disturbance, and the disturbance generated at the vehicle is identified to variably set, based on the identified disturbance, the rate limiter R directed to the addition of the disturbance-correcting yaw moment Mzs. The disturbance-correcting yaw moment Mzs is limited by means of the rate limiter R to output the disturbance-correcting yaw moment Mzs(i). Accordingly, it is possible to suppress any disturbance that acts on the vehicle appropriately, and to allow for a natural traveling control without giving an occupant a sense of discomfort.

Incidentally, JP-A No. 2001-97234 mentioned above discloses a technique on a steering apparatus of a vehicle. The technique disclosed in JP-A No. 2001-97234 involves an automatic steering control that so performs a feedback control of the steering force of a steering device as to cause a lateral position of an own vehicle to come close to a reference position that is determined by traveling lane lines. When a disturbance such as crosswind and bank acts on the own vehicle, lateral force and yawing moment that act on the own vehicle are estimated by operation. By performing the estimation, automatic steering of the steering device is so performed, based on a value, as to cancel the lateral force and the yawing moment resulting from the disturbance. The value is obtained by the addition of a steering amount in feed forward to a steering amount in the feedback control. The technique disclosed in JP-A No. 2001-97234 also changes a determination threshold of the disturbance in accordance with a state of traveling of the own vehicle.

A traveling course of a vehicle is disturbed by a variety of factors, and a way in which a vehicle behavior is disturbed varies from situation to situation. The situation may be an occurrence of crosswind or wandering, an occurrence of yawing attributable to cant of a road surface, or any other situation. The wandering is a disturbance in vehicle behavior attributable to irregularity of the road surface, to a rutted path, or to any other factor. Accordingly, it is necessary to perform a control that is appropriate to a corresponding factor, when detecting and correcting the disturbance in a lateral position in a lane of an own vehicle by means of a vehicle model, such as an observer, that allows for estimation of the vehicle behavior.

To perform the appropriate control, one method may be to change a determination threshold of the disturbance in accordance with a state of traveling of an own vehicle, as in the technique of the vehicle steering apparatus disclosed in JP-A No. 2001-97234. This, however, raises a concern. To take the vehicle behavior attributed to the wandering as an example, the wandering-attributed vehicle behavior is fast in motion and thus requires a fast control operation. Under such circumstances, when control operations to be performed on detected disturbances are uniformly increased in speed, a correction to be performed on the moderate yawing attributed to the canted road surface may become excessive, causing wobbling in the vehicle behavior and ending up giving an occupant a sense of anxiety.

The vehicle traveling control apparatus according to the present implementation of the technology makes it possible to obtain estimation values with favorable accuracy by appropriately correcting factors such as fluctuation and errors in observation values, without involving the necessity of taking into consideration previously an influence of errors between the observation values and the estimation values. Hence, it is possible to smoothly obtain various pieces of information necessary for performing the steering along the lane and to execute a natural steering control.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the setting of each of the environment detection reliability R1 that is based on the road curvature, the environment detection reliability R2 that is based on the to-lane yaw angle, and the environment detection reliability R3 that is based on the in-lane lateral position in the environment detection reliability setter 41, the values of the adoption rates a1 to a6, and the to-lane yaw angle feedback gain K2 and the in-lane lateral position feedback gain K3 in FIGS. 6, 7, and 8, and other settings and values as disclosed herein are illustrative and non-limiting; each of them may be set to any other value depending on specifications.

Further, for example, the reliability of each of the environment detection reliabilities R1, R2, and R3 may be set linearly from 0 to 30 to address various traveling environments. For instance, when the own vehicle is near an entrance of a tunnel, an environment around the own vehicle is visible because the own vehicle is located outside of the tunnel, but the inside of the tunnel ahead of the own vehicle is dark, meaning that the inside of the tunnel corresponds to a traveling environment less visible by a camera. In other words, the reliability based on the map is high for each of the environment detection reliabilities R1 and R2, whereas the reliability based on the camera is high for the environment detection reliability R3. Accordingly, in one implementation, when the vehicle is near the entrance of the tunnel, the environment detection reliability R1 may be set to 11 to allow the adoption rate a2 to be greater than the adoption rate a1, the environment detection reliability R2 may be set to 13 to allow the adoption rate a4 to be greater than the adoption rate a3, and the environment detection reliability R3 may be set to 18 to allow the adoption rate a5 to be greater than the adoption rate a6.

The invention claimed is:

1. A vehicle traveling control apparatus, comprising:
a vehicle parameter detector that detects a vehicle parameter;
a vehicle parameter estimator that estimates, by means of a vehicle model, a vehicle parameter to be outputted in response to an input value;
a disturbance-suppressing parameter calculator that estimates, based on the vehicle parameter detected by the vehicle parameter detector and the vehicle parameter estimated by the vehicle parameter estimator, a disturbance generated at a vehicle, and calculates a disturbance-suppressing parameter that suppresses an influence of the disturbance;
an addition rate changer that identifies, based on the vehicle parameter detected by the vehicle parameter detector and the vehicle parameter estimated by the vehicle parameter estimator, the disturbance generated at the vehicle, and variably sets, based on the identified disturbance, an addition rate of the disturbance-suppressing parameter;
a disturbance suppressor that applies the disturbance-suppressing parameter set by the addition rate changer
a lane information detector that obtains lane information;
a control lane information calculator that performs, based on the vehicle parameter estimated by the vehicle parameter estimator, a feedback of the lane information to calculate control lane information; and
a feedback amount changer that variably sets the lane information to be fed back to the control lane information calculator, based on reliability of the lane information,
wherein the disturbance suppressor is a steering controller that performs a steering control, based on the control lane information.

2. The vehicle traveling control apparatus according to claim 1, wherein the addition rate changer sets the addition rate of the disturbance-suppressing parameter to be outputted from the disturbance suppressor by increasing an upper limit of the addition rate of the disturbance-suppressing parameter, when the identified disturbance is determined as being due to wandering.

3. The vehicle traveling control apparatus according to claim 1, wherein the addition rate changer sets the addition rate of the disturbance-suppressing parameter to be outputted from the disturbance suppressor by decreasing an upper limit of the addition rate of the disturbance-suppressing parameter, when the identified disturbance is determined as being due to traveling on a canted road surface.

4. The vehicle traveling control apparatus according to claim 1, wherein the feedback amount changer sets the lane information to be fed back to the control lane information calculator to be lower with a decrease in the reliability of the lane information.

5. The vehicle traveling control apparatus according to claim 4, wherein the lane information detector
obtains, based on image information and map information, the lane information, and
variably changes, based on reliability of the image information and reliability of the map information, an adoption rate of the lane information that is based on the image information and an adoption rate of the lane information that is based on the map information.

6. The vehicle traveling control apparatus according to claim 5, wherein the lane information detector decreases the adoption rate of the lane information that is based on the image information and increases the adoption rate of the lane information that is based on the map information, when the lane information detector detects from the lane information that a road is under rainy weather condition or snow condition.

7. The vehicle traveling control apparatus according to claim 1, wherein the lane information detector
obtains, based on image information and map information, the lane information, and
variably changes, based on reliability of the image information and reliability of the map information, an adoption rate of the lane information that is based on the image information and an adoption rate of the lane information that is based on the map information.

8. The vehicle traveling control apparatus according to claim 7, wherein the lane information detector decreases the adoption rate of the lane information that is based on the image information and increases the adoption rate of the lane information that is based on the map information, when the lane information detector detects from the lane information that a road is under rainy weather condition or snow condition.

9. The vehicle traveling control apparatus according to claim 1, further comprising a yaw rate detector that detects a yaw rate of the vehicle,
wherein the vehicle parameter estimator estimates the vehicle parameter by performing a feedback of at least a detection value of the yaw rate on the vehicle model, and
wherein the feedback amount changer increases the detection value of the yaw rate to be subjected to the feedback performed on the vehicle model, when a determination is made, from the detection value of the yaw rate, that a calculation error increases in a calculation that is based on the vehicle model.

10. The vehicle traveling control apparatus according to claim 9, wherein the feedback amount changer increases the lane information to be subjected to the feedback performed by the vehicle parameter estimator, when the lane information detector detects a presence of a vehicle that runs parallel to the vehicle.

11. The vehicle traveling control apparatus according to claim 1, further comprising a yaw rate detector that detects a yaw rate of the vehicle,
wherein the vehicle parameter estimator estimates the vehicle parameter by performing a feedback of at least a detection value of the yaw rate on the vehicle model, and
wherein the feedback amount changer increases the lane information to be subjected to the feedback performed by the vehicle parameter estimator, when the lane information detector detects a presence of a vehicle that runs parallel to the vehicle.

12. The vehicle traveling control apparatus according to claim 1, wherein the lane information detector is a forward environment recognizer including cameras to obtain environment around the vehicle.

13. The vehicle traveling control apparatus according to claim 1, wherein the lane information detector is a navigation system.

* * * * *